United States Patent
Kopelman et al.

(10) Patent No.: US 11,642,198 B2
(45) Date of Patent: May 9, 2023

(54) ELASTIC-COATED ORTHODONTIC APPLIANCE

(71) Applicant: Align Technology, Inc., San Jose, CA (US)

(72) Inventors: Avi Kopelman, Palo Alto, CA (US); Jeeyoung Choi, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 58 days.

(21) Appl. No.: 14/610,108

(22) Filed: Jan. 30, 2015

(65) Prior Publication Data

US 2015/0366638 A1 Dec. 24, 2015

Related U.S. Application Data

(60) Provisional application No. 62/015,217, filed on Jun. 20, 2014.

(51) Int. Cl.
| | | |
|---|---|---|
| *A61C 7/08* | (2006.01) | |
| *A61C 7/00* | (2006.01) | |
| *A61C 7/14* | (2006.01) | |
| *B05D 1/02* | (2006.01) | |
| *B05D 1/26* | (2006.01) | |

(52) U.S. Cl.
CPC ............... *A61C 7/08* (2013.01); *A61C 7/002* (2013.01); *A61C 7/14* (2013.01); *B05D 1/02* (2013.01); *B05D 1/265* (2013.01); *Y10T 156/1092* (2015.01)

(58) Field of Classification Search
CPC .. A61C 7/08; A61C 7/002; A61C 7/14; B05D 1/02; B05D 1/265; Y10T 156/1092
See application file for complete search history.

(56) References Cited

U.S. PATENT DOCUMENTS

| | | |
|---|---|---|
| 2,467,432 A | 4/1949 | Kesling |
| 3,237,305 A | 3/1966 | Hegedus |
| 3,334,417 A | 8/1967 | Spengeman |
| 3,407,500 A | 10/1968 | Kesling |
| 3,593,421 A | 7/1971 | Allen |

(Continued)

FOREIGN PATENT DOCUMENTS

| | | |
|---|---|---|
| AU | 3031677 A | 5/1979 |
| AU | 517102 B2 | 7/1981 |

(Continued)

OTHER PUBLICATIONS

Carbon3D. CLIP Technology. A new appraochto 3D printing. 2015. http://carbon3d.com/ Accessed Jul. 1, 2015. 1 page.

(Continued)

*Primary Examiner* — Nicholas D Lucchesi
*Assistant Examiner* — Hao D Mai
(74) *Attorney, Agent, or Firm* — Fortem IP LLP

(57) ABSTRACT

An orthodontic appliance can include a shell having a plurality of cavities shaped to receive a patient's teeth is disclosed. The orthodontic appliance may comprise an interior surface and an exterior surface, and an elastic coating covering at least a portion of one or more of the interior surface or exterior surface of the shell. A stiffness of a portion of the orthodontic appliance corresponding to the portion of the shell covered by the elastic coating can be determined by a stiffness of the elastic coating.

33 Claims, 8 Drawing Sheets

(56) References Cited

U.S. PATENT DOCUMENTS

| | | |
|---|---|---|
| 3,600,808 A | 8/1971 | Reeve |
| 3,660,900 A | 5/1972 | Andrews |
| 3,683,502 A | 8/1972 | Wallshein |
| 3,738,005 A | 6/1973 | Cohen |
| 3,762,050 A | 10/1973 | Dal Pont G |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 3,988,832 A | 11/1976 | Wallshein |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,413,978 A | 11/1983 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordon et al. |
| 6,178,967 B1 | 1/2001 | Barnes, Sr. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren |
| 6,244,861 B1 | 6/2001 | Andreiko et al. |
| 6,293,790 B1 | 9/2001 | Hilliard |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,386,864 B1 | 5/2002 | Kuo |
| 6,398,548 B1 | 6/2002 | Muhammad et al. |
| 6,402,707 B1 | 6/2002 | Ernst |
| 6,450,807 B1 | 9/2002 | Chishti et al. |
| 6,454,565 B2 | 9/2002 | Phan et al. |
| 6,471,511 B1 | 10/2002 | Chishti et al. |
| 6,482,298 B1 | 11/2002 | Bhatnagar |
| 6,524,101 B1 | 2/2003 | Phan et al. |
| 6,554,611 B2 | 4/2003 | Chishti et al. |

(56) References Cited

U.S. PATENT DOCUMENTS

| | | |
|---|---|---|
| 6,572,372 B1 | 6/2003 | Phan et al. |
| 6,629,840 B2 | 10/2003 | Chishti et al. |
| 6,702,575 B2 | 3/2004 | Hilliard |
| 6,705,863 B2 | 3/2004 | Phan et al. |
| 6,722,880 B2 | 4/2004 | Chishti et al. |
| 6,749,414 B1 | 6/2004 | Hanson et al. |
| 6,830,450 B2 | 12/2004 | Knopp et al. |
| 7,077,646 B2 | 7/2006 | Hilliard |
| 7,553,157 B2 | 6/2009 | Abolfathi et al. |
| 7,637,262 B2 | 12/2009 | Bailey |
| 7,810,503 B2 | 10/2010 | Magnin |
| 7,831,322 B2 | 11/2010 | Liu et al. |
| 7,878,801 B2 | 2/2011 | Abolfathi et al. |
| 7,892,474 B2 | 2/2011 | Shkolnik et al. |
| 8,118,592 B2 | 2/2012 | Tortorici |
| 8,439,672 B2 | 5/2013 | Matov et al. |
| 8,439,674 B2 | 5/2013 | Li et al. |
| 8,444,412 B2 | 5/2013 | Baughman et al. |
| 8,517,726 B2 | 8/2013 | Kakavand et al. |
| 8,758,009 B2 | 6/2014 | Chen et al. |
| 8,858,226 B2 | 10/2014 | Phan et al. |
| 8,899,976 B2 | 12/2014 | Chen et al. |
| 8,899,977 B2 | 12/2014 | Cao et al. |
| 9,655,691 B2 | 5/2017 | Li et al. |
| 9,795,460 B2 | 10/2017 | Martz et al. |
| 10,179,035 B2 | 1/2019 | Shivapuja et al. |
| 10,299,894 B2 | 5/2019 | Tanugula et al. |
| 10,885,521 B2 | 1/2021 | Miller et al. |
| 11,045,282 B2 | 6/2021 | Kopelman et al. |
| 11,259,896 B2 | 3/2022 | Matov et al. |
| 11,318,667 B2 | 5/2022 | Mojdeh et al. |
| 2001/0041320 A1* | 11/2001 | Phan .................... A61C 7/00 433/6 |
| 2002/0006597 A1 | 1/2002 | Andreiko et al. |
| 2002/0051951 A1 | 5/2002 | Chishti et al. |
| 2002/0187451 A1 | 12/2002 | Phan et al. |
| 2002/0192617 A1 | 12/2002 | Phan et al. |
| 2003/0009252 A1 | 1/2003 | Pavlovskaia et al. |
| 2003/0139834 A1 | 7/2003 | Nikolskiy et al. |
| 2003/0190575 A1 | 10/2003 | Hilliard |
| 2003/0198911 A1 | 10/2003 | Knopp et al. |
| 2003/0198912 A1 | 10/2003 | Mah |
| 2003/0207224 A1 | 11/2003 | Lotte |
| 2003/0224311 A1 | 12/2003 | Cronauer |
| 2004/0067463 A1 | 4/2004 | Rosenberg |
| 2004/0128010 A1 | 7/2004 | Pavlovskaia et al. |
| 2004/0166462 A1 | 8/2004 | Phan et al. |
| 2004/0209218 A1 | 10/2004 | Chishti et al. |
| 2004/0229185 A1 | 11/2004 | Knopp |
| 2005/0048433 A1 | 3/2005 | Hilliard |
| 2005/0055118 A1 | 3/2005 | Nikolskiy et al. |
| 2005/0100853 A1 | 5/2005 | Tadros et al. |
| 2005/0186524 A1 | 8/2005 | Abolfathi et al. |
| 2005/0186526 A1 | 8/2005 | Stewart et al. |
| 2005/0208450 A1 | 9/2005 | Sachdeva et al. |
| 2005/0233276 A1 | 10/2005 | Kopelman et al. |
| 2006/0068353 A1 | 3/2006 | Abolfathi et al. |
| 2006/0078841 A1 | 4/2006 | Desimone et al. |
| 2006/0093992 A1 | 5/2006 | Wen |
| 2006/0199142 A1 | 9/2006 | Liu et al. |
| 2006/0199153 A1 | 9/2006 | Liu et al. |
| 2007/0231765 A1 | 10/2007 | Phan et al. |
| 2007/0275340 A1 | 11/2007 | Kopelman et al. |
| 2008/0050692 A1 | 2/2008 | Hilliard |
| 2008/0254402 A1 | 10/2008 | Hilliard |
| 2008/0268400 A1* | 10/2008 | Moss .................... A61C 9/00 433/24 |
| 2009/0014013 A1 | 1/2009 | Magnin |
| 2009/0061375 A1 | 3/2009 | Yamamoto et al. |
| 2009/0098500 A1 | 4/2009 | Diaz |
| 2009/0191502 A1 | 7/2009 | Cao et al. |
| 2009/0298006 A1 | 12/2009 | Schwartz |
| 2010/0068671 A1 | 3/2010 | Kakavand et al. |
| 2010/0075268 A1 | 3/2010 | Duran |
| 2010/0086890 A1* | 4/2010 | Kuo .................... A61C 7/08 433/6 |
| 2010/0092905 A1 | 4/2010 | Martin et al. |
| 2010/0138025 A1 | 6/2010 | Morton et al. |
| 2010/0151404 A1 | 6/2010 | Wu et al. |
| 2010/0279245 A1 | 11/2010 | Navarro |
| 2011/0020761 A1 | 1/2011 | Kalili |
| 2011/0039223 A1 | 2/2011 | Li et al. |
| 2011/0185525 A1 | 8/2011 | Stapelbroek et al. |
| 2011/0269091 A1 | 11/2011 | Li et al. |
| 2011/0269092 A1 | 11/2011 | Kuo et al. |
| 2011/0281229 A1 | 11/2011 | Abolfathi et al. |
| 2012/0082950 A1 | 4/2012 | Li et al. |
| 2012/0150494 A1 | 6/2012 | Anderson et al. |
| 2012/0270173 A1 | 10/2012 | Pumphrey et al. |
| 2012/0282565 A1 | 11/2012 | Adell |
| 2013/0078594 A1* | 3/2013 | Leslie-Martin .......... A61C 7/08 433/6 |
| 2013/0089828 A1 | 4/2013 | Borovinskih et al. |
| 2013/0095446 A1 | 4/2013 | Andreiko et al. |
| 2013/0122448 A1 | 5/2013 | Kitching |
| 2013/0157213 A1 | 6/2013 | Arruda |
| 2013/0204583 A1 | 8/2013 | Matov et al. |
| 2013/0244194 A1 | 9/2013 | Bergersen |
| 2013/0302742 A1 | 11/2013 | Li et al. |
| 2013/0323665 A1 | 12/2013 | Dinh et al. |
| 2014/0011162 A1 | 1/2014 | Zegarelli |
| 2014/0061974 A1 | 3/2014 | Tyler |
| 2014/0178829 A1 | 6/2014 | Kim |
| 2014/0193767 A1 | 7/2014 | Li et al. |
| 2014/0265034 A1 | 9/2014 | Dudley |
| 2014/0300676 A1 | 10/2014 | Miller et al. |
| 2014/0363779 A1 | 12/2014 | Kopelman et al. |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0157421 A1 | 6/2015 | Martz et al. |
| 2015/0216627 A1 | 8/2015 | Kopelman |
| 2015/0238283 A1 | 8/2015 | Tanugula et al. |
| 2015/0257856 A1 | 9/2015 | Martz et al. |
| 2015/0265376 A1 | 9/2015 | Kopelman |
| 2015/0305832 A1 | 10/2015 | Patel |
| 2015/0366637 A1 | 12/2015 | Kopelman et al. |
| 2016/0081769 A1 | 3/2016 | Kimura et al. |
| 2016/0128803 A1 | 5/2016 | Webber et al. |
| 2016/0135925 A1 | 5/2016 | Mason et al. |
| 2016/0310236 A1 | 10/2016 | Kopelman |
| 2017/0007367 A1 | 1/2017 | Li et al. |
| 2017/0007368 A1 | 1/2017 | Boronkay |
| 2017/0007371 A1 | 1/2017 | Robichaud |
| 2017/0100210 A1 | 4/2017 | Wen |
| 2017/0367792 A1 | 12/2017 | Raby et al. |
| 2017/0367793 A1 | 12/2017 | Veis |
| 2018/0000564 A1 | 1/2018 | Cam et al. |

FOREIGN PATENT DOCUMENTS

| | | |
|---|---|---|
| AU | 5598894 A | 6/1994 |
| CA | 1121955 | 4/1982 |
| CN | 1575782 A | 2/2005 |
| CN | 1655731 A | 8/2005 |
| CN | 1684638 A | 10/2005 |
| CN | 101188981 A | 5/2008 |
| CN | 101404952 A | 4/2009 |
| CN | 202589687 U | 12/2012 |
| CN | 103340690 A | 10/2013 |
| DE | 2749802 | 5/1978 |
| DE | 69327661 T | 7/2000 |
| DE | 102010036107 A1 | 3/2012 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 8/1995 |
| EP | 0731673 B1 | 9/1996 |
| EP | 0774933 B1 | 5/1997 |
| EP | 1806064 A1 | 7/2007 |
| EP | 2000110 A2 | 12/2008 |

(56) References Cited

FOREIGN PATENT DOCUMENTS

| | | |
|---|---|---|
| EP | 2138124 A1 | 12/2009 |
| ES | 463897 | 1/1980 |
| FR | 2369828 A1 | 6/1978 |
| FR | 2652256 A1 | 3/1991 |
| FR | 2872406 A1 | 1/2006 |
| GB | 1550777 A | 8/1979 |
| GB | 15500777 | 8/1979 |
| JP | 53-058191 | 5/1978 |
| JP | 04-028359 | 1/1992 |
| JP | 08-508174 | 9/1996 |
| JP | H08508174 A | 9/1996 |
| JP | 2004016632 A | 1/2004 |
| JP | 2007260158 A | 10/2007 |
| JP | 4184427 B1 | 11/2008 |
| JP | 2009153577 A | 7/2009 |
| JP | 2013123626 A | 6/2013 |
| KR | 200465679 Y1 | 3/2013 |
| TW | M464148 U | 11/2013 |
| WO | WO 90/08512 A1 | 8/1990 |
| WO | WO 91/04713 A1 | 4/1991 |
| WO | WO 94/10935 A1 | 5/1994 |
| WO | WO 98/32394 A1 | 7/1998 |
| WO | WO 98/44865 A1 | 10/1998 |
| WO | WO 98/58596 A1 | 12/1998 |
| WO | WO 01/80764 A1 | 11/2001 |
| WO | WO 2006/044012 A1 | 4/2006 |
| WO | WO-2006096558 A2 | 9/2006 |
| WO | WO-2007110071 A1 | 10/2007 |
| WO | WO 2008/073766 A2 | 6/2008 |
| WO | WO-2015114450 A1 | 8/2015 |
| WO | WO-2015140614 A1 | 9/2015 |
| WO | WO-2015193709 A1 | 12/2015 |
| WO | WO-2015193710 A1 | 12/2015 |

OTHER PUBLICATIONS

Composite material. Wikipedia. Last modified Jun. 22, 2015. https://en.wikipedia.org/wiki/Composite_material. 3 pages.
Desimone. What if 3D printing was 100% faster? TEDtalk. Mar. 2015. http://www.ted.com/talks/joe_desimone_what_if_3d_printing_was_25x_faster. 11 pages.
Halterman. A path to the future—continuous composite 3D printing. Nov. 12, 2014. http://www.3dprinterworld.com/article/path-future-continuous-composite-3d-printing. 4 pages.
HIPOLITE. Helios One 3D Printer—New Heliolithography Technology Could Eventually Replace SLA and FDM. Jul. 2, 2014. http://3dprint.com/7958/orange-maker-helio-one-3d/ 28 pages.
International search report and written opinion dated Jul. 31, 2015 for PCT/IB2015/000106.
Objet Geometries. Wikipedia. Last modified Jul. 17, 2014. https://en.wikipedia.org/wiki/Objet_Geometries. 3 pages.
Orange Maker. High resolution 3D printing technology. 2015. http://www.orangemaker.com/. Accessed Jul. 1, 2015. 9 pages.
Rapid prototyping. Protosys Technologies. 2005. http://www.protosystech.com/rapid-prototyping.htm. Accessed Jul. 1, 2015. 2 pages.
The Orange Maker Spins The Plate To Make Better 3D Prints. Newloop Tech and Gadgets. YouTube. Jul. 11, 2014. https://www.youtube.com/watch?v=MpzPWURWfZk. 2 pages.
International search report and written opinion dated Apr. 23, 2015 for PCT/IB2015/000104.
International search report and written opinion dated May 13, 2015 for PCT/IB2015/000108.
International search report and written opinion dated May 19, 2015 for PCT/IB2015/000112.
Written opinion of the international preliminary examining authority dated Jan. 14, 2016 for PCT/IB2015/000112.
Co-pending U.S. Appl. No. 16/786,353, filed Feb. 10, 2020.
Co-pending U.S. Appl. No. 16/926,432, filed Jul. 10, 2020.
GIM-ALLDENT Deutschland, "Das DUX System: Die Technik," (with Certified English Translation), 5 pages total (2002).
Mormann et al., "Marginale Adaptation von adhasuven Porzellaninlays in vitro," (with Certified English Translation), Separatdruck aus: Schweiz. Mschr. Zahnmed. 95: 1118-1129, 1985, (total of 24 pages).
SIEMENS, "CEREC—Computer-Reconstruction," (with Certified English Translation), High Tech in der Zahnmedizin, 29 pages total (2004).
SIRONA Dental Systems GmbH, CEREC 3D, Manuel utilisateur, Version 2.0X (in French with Certified English Translation), 2003, 229 pages total.
U.S. Appl. No. 14/609,970, filed Jan. 30, 2015, Kopelman.
U.S. Appl. No. 14/610,027, filed Jan. 30, 2015, Kopelman.
U.S. Appl. No. 14/610,060, filed Jan. 30, 2015, Kopelman et al.
AADR. American Association for Dental Research, Summary of Activities, Mar. 20-23, 1980, Los ngeles, CA, p. 195.
Alcaniz, et aL, "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler et al., "Analysis of 3-D Data for Comparative 3-D Serial Growth Pattern Studies of Oral-Facial Structures," AADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging q Applications for Automated Industrial Inspection and Assembly, vol. 182, p. 187-191 (1979).
Altschuler, "3D Mapping of Maxillo-Facial Prosthesis," AADR Abstract #607, 2 pages total, (1980).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapter 3, pp. 13-24 (1989).
Bartels, et al. An Introduction to Splines for Use in Computer Graphics and Geometric Modeling, Morgan Kaufmann Publishers, pp. 422-425 (1987).
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of III., Aug. 26-30, 1975, pp. 142-166.
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A ProgressReport," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff et al., "Computerized Analysis of Occlusion in the Postcanine Dentition," Am. J. Orthod., 61(3): 245-254 (Mar. 1972).
Biggerstaff, "Computerized Diagnostic Setups and Simulations," Angle Orthod., 40(1):28-36 (Jan. 1970).

(56) References Cited

OTHER PUBLICATIONS

BIOSTAR Opeation & Training Manual. Great Lakes Orthodontics, Ltd. 199 Fire Tower Drive,Tonawanda, New York. 14150-5890, 20 pages total (1990).
Blu, et al., "Linear interpolation revitalized", IEEE Trans. Image Proc., 13(5):710-719 (May 2004).
Bourke, "Coordinate System Transformation," (Jun. 1996), p. 1, retrieved from the Internet Nov. 5, 2004, URL <http://astronomy.swin.edu.au/-pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: IK Comparison with Manual Measurements of Mesio-distal Diameter," J. Dent. Res., 65(3):428-431 (Mar. 1986).
Burstone (interview), "Dr. Charles J. Burstone on The Uses ofthe Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Cardinal Industrial Finishes, Powder Coatings information posted at <http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence ofthe Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1: CAD/CAM: The Computer Moves Chairside," "Part 2: F. Duret—A Man With A Vision," "Part 3: The Computer Gives New Vision—Literally," "Part 4; Bytes N Bites" The Computer Moves From The Front Desk To The Opcratory, Canadian Dental Journal, vol. 54(9), pp. 661-666 (1988).
Crooks, "CAD/CAM Comes to USA," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University ofthe Pacific," Semin. Orthod., 7(4):258-265 (Dec. 2001).
Cutting et al., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production, pp. 1-7 (Jan. 1992).
Definition for gingiva. Dictionary.com p. 1-3. Retrieved from the internet Nov. 5, 2004 <http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at <http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD-CAM in Dentistry," J. Am. Dent. Assoc. 117:715-720 (Nov. 1988).
Duret et al., "CAD/CAM Imaging in Dentistry," Curr. Opin. Dent., 1:150-154 (1991).
Duret, "The Dental CAD/CAM, General Description ofthe Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet: <http://wscg.zcu.cz/wscg98/papers98/Strasser98.pdf>, 8 pages.
Gao et al., "3-D element Generation for Multi-Connected Complex Dental and Mandibular Structure," Proc. Intl Workshop on Medical Imaging and Augmented Reabty, pp. 267-271 (Jun. 12, 2001).
GIM-ALLDENT Deutschland, "Das DUX System: Die Technik," 2 pages total (2002).
Gotileib et al., "JCO Interviews Dr. James A. McNamura, Jr., on the Frankel Appliance: Part 2: Clinical 1-1 Management, "J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances—Pro Lab, 1 page 1998).
Invitation to Pay Addition Fees dated Apr. 28, 2015 for PCT/IB2015/000106.
JCO Interviews, Craig Andreiko , DDS, MS on the Elan and Orthos Systems, JCO, pp. 459-468 (Aug. 1994).

(56) References Cited

OTHER PUBLICATIONS

JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment ofthe Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling et al., The Philosophy of the Tooth Positioning Appliance, American Journal of Orthodontics and Oral surgery. 1945; 31:297-304.
Kesling, Coordinating the Predetermined Pattern and Tooth Positioner with Conventional Treatment, Am. J. Orthod. Oral Surg. (1946) 32:285-293.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991).
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
Mccann, "Inside the ADA," J. Amer. Dent. Assoc., 118:286-294 (Mar. 1989).
Mcnamara et al., "Invisible Retainers," J. Cfin. Orthod., pp. 570-578 (Aug. 1985).
Mcnamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Scparatdruckaus:Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4,1998, pp. 2415-2418.

Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
PROCERA Research Projects, "PROCERA Research Projects 1993—Abstract Collection," pp. 3-7, 28 (1993).
Proffit et al., Contemporary Orthodontics, (Second Ed.), Chapter 15, Mosby Inc., pp. 470-533 (Oct. 1993).
Raintree Essix & ARS Materials, Inc., Raintree Essix, Technical Magazine Table of contents and Essix Appliances, <http://www.essix.com/magazine/defaulthtml> Aug. 13, 1997.
Redmond et al., "Clinical Implications of Digital Orthodontics," Am. J. Orthod. Dentofacial Orthop, 117(2):240-242 (2000).
Rekow et a/, "CAD/CAM for Dental Restorations—Some of the Curious Challenges," IEEE Trans. Biomed. Eng, 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View ofthe Future," J. Can. Dent. Assoc., 58(4):283, 287-288 (Apr. 1992).
Rekow, "Computer-Aided Design and Manufacturing in Dentistry: A Review ofthe State ofthe Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow, "Feasibility of an Automated System for Production of Dental Restorations, Ph.D. Thesis," Univ, of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis; Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively).
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Comer," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee III Orthodontic Appliances—Pro Lab

(56) References Cited

OTHER PUBLICATIONS product information for doctors. http://ormco.com/aoa/appliancesservices/RWB/doctorhtml>, 5 pages (May 19, 2003).
The Choice is Clear: Red, White & Blue . . . The Simple, Affordable, No-Braces Treatment, Allesee HJ Orthodontic Appliances—Pro Lab product information for patients, <http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances—Pro Lab product information, 6 pages (2003).
The Red, White & Blue Way to Improve Your Smile! Allesee Orthodontic Appliances—Pro Lab product information for patients, 2 pages 1992.
Truax L., "Truax Clasp-Less(TM) Appliance System," Funct. Orthod., 9(5):22-4, 26-8 (Sep.-Oct. 1992).
TRU-TAIN Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden et al., "Three-Dimensional Analysis of Dental Casts by Means of the Optocom," J. Dent. Res., p. 1100 (Jul.-Aug. 1972).
Van Der Linden, "A New Method to Determine Tooth Positions and Dental Arch Dimensions," J. Dent. Res., 51(4):1104 (Jul.-Aug. 1972).
Van Der Zel, "Ceramic-Fused-to-Metal Restorations with a New CAD/CAM System," Quintessence Int., 24(11):769-778 (1993).
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
WarunekK et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxiiofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
Yoshii, "Research on a New Orthodontic Appliance; The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
You May Be A Candidate For This Invisible No-Braces Treatment, Allesee Orthodontic Appliances—Pro Lab product information for patients, 2 pages (2002).

* cited by examiner

ELASTIC-COATED ORTHODONTIC APPLIANCE

CROSS-REFERENCE

This application claims the benefit of U.S. Provisional Application No. 62/015,217, filed Jun. 20, 2014, which application is incorporated herein by reference in its entirety.

BACKGROUND

Orthodontic procedures typically involve repositioning a patient's teeth to a desired arrangement in order to correct malocclusions and/or improve aesthetics. To achieve these objectives, orthodontic appliances such as braces, retainers, shell aligners, and the like can be applied to the patient's teeth by an orthodontic practitioner. The appliance is configured to exert force on one or more teeth in order to effect desired tooth movements. The application of force can be periodically adjusted by the practitioner (e.g., by altering the appliance or using different types of appliances) in order to incrementally reposition the teeth to a desired arrangement.

In some instances, however, current orthodontic appliances may not be able to effectively generate the forces needed to achieve the desired tooth repositioning, or may not afford sufficient control over the forces applied to the teeth. The prior orthodontic approaches may often employ a single appliance shell with homogeneous and/or continuous material properties, which can provide less than ideal movement and comfort. Additionally, the rigidity of some existing appliances may interfere with the ability of the appliance to be coupled to the patient's teeth and may increase patient discomfort.

SUMMARY

Improved orthodontic appliances, as well as related systems and methods, are provided. An orthodontic appliance can include a thin, flexible shell covered by an elastic coating. The properties of the elastic coating may dictate the overall properties of the appliance, such as the stiffness of the appliance. When worn by a patient, the appliance may apply forces onto the underlying teeth via the elastic coating in order to reposition the teeth. The appliances described herein provide enhanced control over forces exerted onto the teeth, thus enabling improved orthodontic treatment procedures.

Accordingly, in one aspect, an orthodontic appliance includes a shell having a plurality of cavities shaped to receive a patient's teeth and comprising an interior surface and an exterior surface, and an elastic coating covering at least a portion of one or more of the interior surface or exterior surface of the shell. A stiffness of a portion of the orthodontic appliance corresponding to the portion of the shell covered by the elastic coating is determined by a stiffness of the elastic coating.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
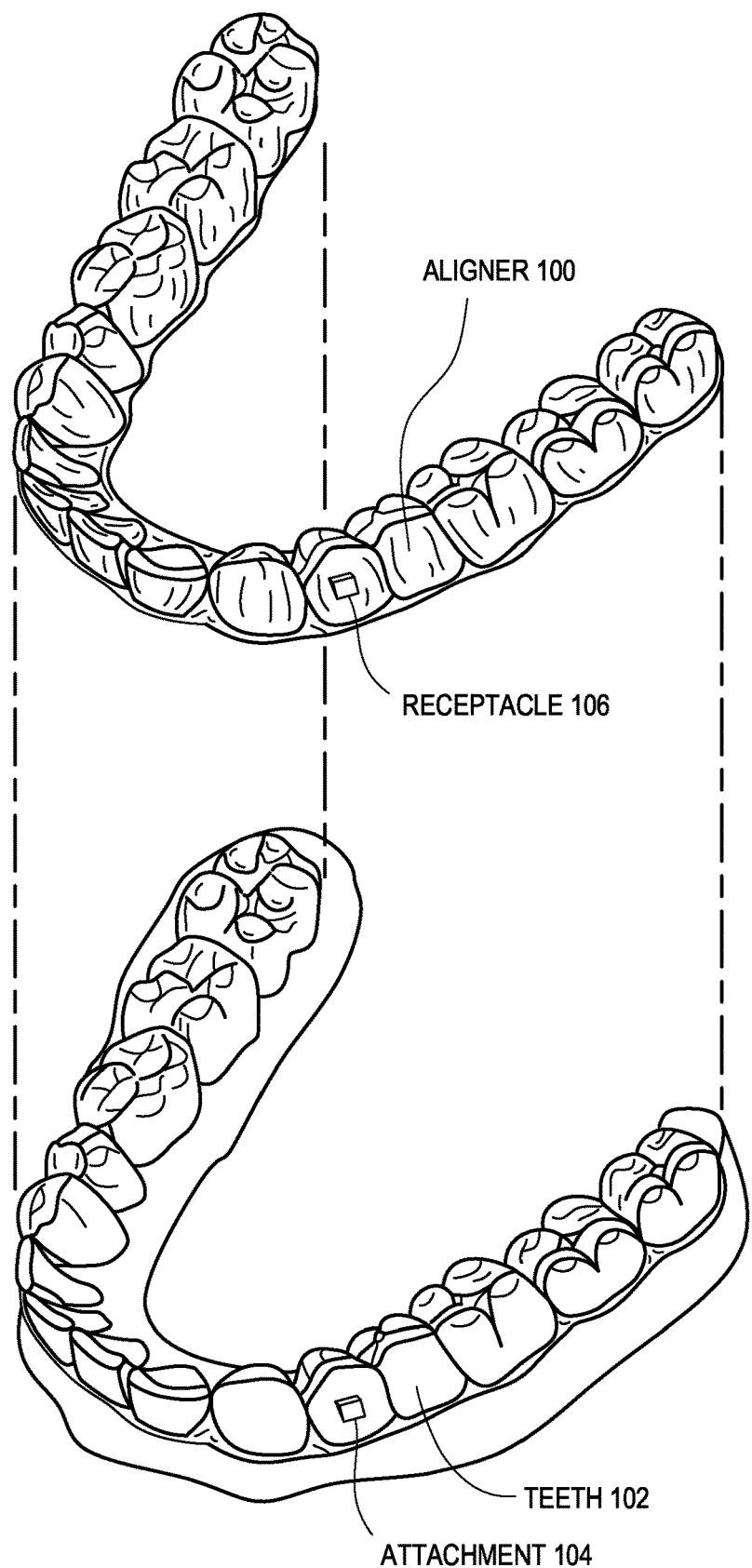
FIG. 1A illustrates a tooth repositioning appliance, in accordance with many embodiments.

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein.

As used herein, A and/or B encompasses one or more of A or B, and combinations thereof such as A and B.

The orthodontic appliances described herein, along with related systems and methods, can be employed as part of an orthodontic treatment procedure in order to reposition one or more teeth, maintain a current position of one or more teeth, or suitable combinations thereof. An orthodontic appliance can include a shell covered at least in part by an elastic coating. The shell can be relatively thin and compliant compared to the elastic coating. Consequently, the properties of the coated portions of the appliance may be controlled primarily by the properties of the elastic coating, such that the tooth repositioning forces generated by the appliance are provided wholly or predominantly by the elastic coating. The material properties (e.g., stiffness) of the appliances described herein can be varied via the elastic coating, thus affording different force application to different teeth of the patient's arch and, in some instances, more precise application or delivery of one or more forces to teeth with decreased patient discomfort.

Thus, in one aspect, an orthodontic appliance includes a shell having a plurality of cavities shaped to receive a patient's teeth and comprising an interior surface and an exterior surface, and an elastic coating covering at least a portion of one or more of the interior surface or exterior surface of the shell. A stiffness of a portion of the orthodontic appliance corresponding to the portion of the shell covered with the elastic coating is determined by a stiffness of the elastic coating. In some instances, the stiffness of the portion can be determined mainly by the stiffness of the elastic coating.

The elastic coating may vary in design. For example, the elastic coating can have a variable thickness over the portion of the shell. The stiffness of the elastic coating can be variable over the portion of the shell. The portion can include any part of the shell, such as the entire shell. Various techniques can be used to couple the elastic coating to the shell. In some instances, the elastic coating can be sprayed or extruded onto the portion of the shell. The elastic coating can be formed by attaching discrete pieces of elastic material to the shell. The elastic coating can be transparent, translucent, or opaque. Optionally, the elastic coating can be colored.

The shell may be flexible. The dimensions of the shell can be varied. For example, a thickness of the shell can be less than or equal to about 0.02 mm.

In another aspect, an appliance as described herein may be included in a series of appliances so as to provide an orthodontic system for positioning teeth. Such an orthodontic system can include a plurality of orthodontic appliances each comprising a shell including one or more cavities shaped to receive at least portions of a patient's teeth. The appliances may be successively worn or wearable by the patient to move one or more teeth from a first arrangement to a second arrangement. One or more of the appliances can include an elastic-coated orthodontic appliance as described herein. For example, an elastic-coated appliance of a system can include an appliance shell having a plurality of cavities shaped to receive the patient's teeth and comprising an interior surface and an exterior surface; and an elastic coating covering at least a portion of one or more of the interior surface or exterior surface of the appliance shell, wherein stiffness of a portion of the orthodontic appliance corresponding to the portion of the appliance shell covered with the elastic coating is determined by a stiffness of the elastic coating.

The characteristics of an appliance of an orthodontic system can be varied as necessary in order to impart the desired tooth repositioning forces to a patient's teeth. For instance, the elastic coating can have a variable thickness over the portion of the appliance shell. Alternatively or in addition, the stiffness of the elastic coating can be variable over the portion of the appliance shell. The portion of the appliance shell covered by the elastic coating can include the entire appliance shell. The method for fabricating an appliance can be varied. For example, the elastic coating can be sprayed or extruded onto the portion of the appliance shell. In many embodiments, the elastic coating is formed by attaching discrete pieces of elastic material to the appliance shell. The aesthetics of the elastic coating can be varied as desired, such that the elastic coating can be transparent, translucent, opaque, and/or colored.

A shell of an orthodontic appliance can be manufactured with any suitable characteristics. For example, the appliance shell may be flexible. A thickness of the appliance shell can be less than or equal to 0.02 mm.

In another aspect, a method for creating an orthodontic appliance is provided herein. A method of creating or fabricating an appliance can include providing a shell having a plurality of cavities shaped to receive a patient's teeth and comprising an interior surface and an exterior surface. At least a portion of one or more of the interior surface or exterior surface of the shell may be covered with an elastic coating, such that a stiffness of a portion of the orthodontic appliance corresponding to the portion of the shell covered with the elastic coating is determined by a stiffness of the elastic coating.

A method may permit the design of the elastic coating to be varied. For example, the elastic coating can have a variable thickness over the portion of the shell. The stiffness of the elastic coating can be variable over the portion of the shell. The portion can include the entire shell. Covering at least a portion of the interior and/or exterior surface of the shell with the elastic coating can include spraying or extruding the elastic coating onto the portion of the shell, as well as attaching discrete pieces of elastic material onto the shell. The elastic coating can be transparent, translucent, opaque, and/or colored.

The provided shell may be flexible. A thickness of the shell can be any suitable amount, such as less than or equal to about 0.02 mm.

In another aspect, a method for creating an orthodontic appliance is provided herein. A method of creating or fabricating an appliance can include providing a shell having a plurality of cavities shaped to receive a patient's teeth. At least a portion of one or more of the interior surface or exterior surface of the shell may be covered with an elastic coating. The method can further include removing the shell from the elastic coating in order to form the orthodontic appliance comprising the elastic coating.

The various steps and features of the method can be varied as desired. For example, covering at least a portion of the interior and/or exterior surface of the shell with the elastic coating can include spraying or extruding the elastic coating onto the portion of the shell, as well as attaching discrete pieces of elastic material onto the shell. As another example, removing the shell can comprise dissolving the shell or releasing the shell from the elastic coating.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. In one embodiment, an appliance or portion(s) thereof may be indirectly fabricated using a physical model of teeth. For example, an appliance (e.g., polymeric appliance) can be formed using a physical model of teeth and a sheet of suitable layers of polymeric material. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
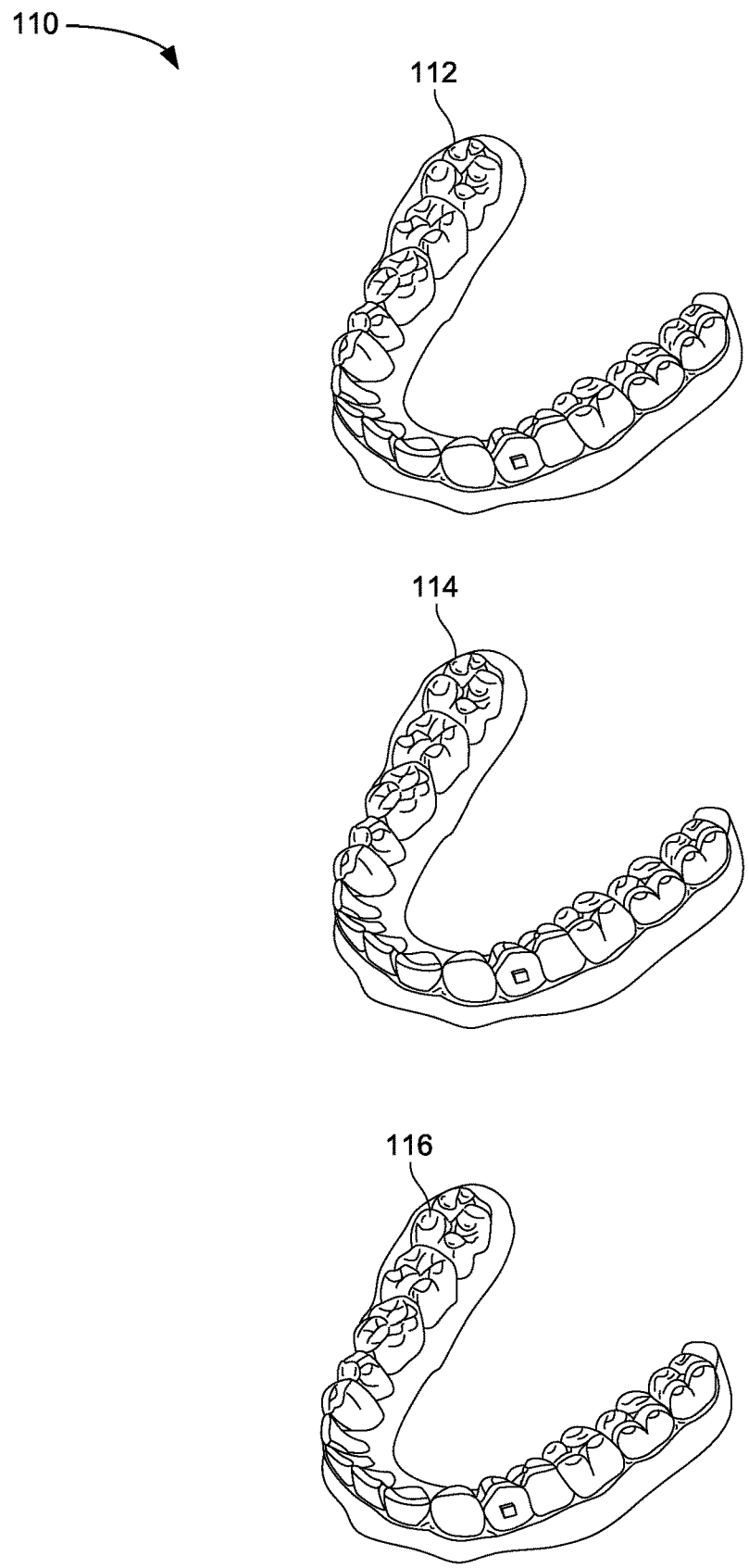
FIG. 1B illustrates a tooth repositioning system, in accordance with many embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implant, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 2:
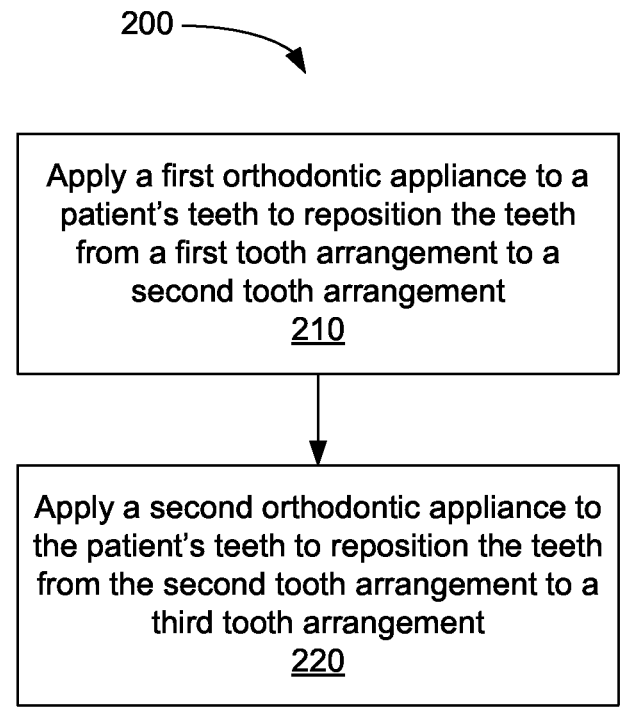
FIG. 2 illustrates a method of orthodontic treatment using a plurality of appliances, in accordance with many embodiments.

FIG. 2 illustrates a method 200 of orthodontic treatment using a plurality of appliances, in accordance with many embodiments. The method 200 can be practiced using any of the appliances or appliance sets described herein. In step 210, a first orthodontic appliance is applied to a patient's teeth in order to reposition the teeth from a first tooth arrangement to a second tooth arrangement. In step 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Although the above steps show a method 200 of orthodontic treatment using a plurality of appliances in accordance with embodiments, a person of ordinary skill in the art will recognize many variations based on the teaching described herein. Some of the steps may comprise sub-steps. Many of the steps may be repeated as often as beneficial to the treatment. One or more steps of the method 200 may be applied to any suitable orthodontic appliance, such as the embodiments described herein.

Various embodiments and configurations of appliances can be used with the orthodontic systems and treatment procedures described herein. For example, an orthodontic appliance can include a thin shell covered wholly or in part by a coating of elastic material. The shell may serve primarily as a template for the geometry of the elastic coating, and thus the properties (e.g., stiffness, thickness) of the shell may provide relatively little contribution to the overall properties (e.g., stiffness, thickness) of the appliance. The properties of the appliance may be determined primarily by the properties of the elastic coating. This may mean, for instance, that the elastic coating is responsible for at least 50%, at least 75%, at least 80%, or at least 90%, of the value of the property of the appliance. For example, the elastic modulus of the shell can be approximately 2000 psi, or within a range from approximately 200 psi to approximately 20,000 psi, while the elastic modulus of the coating may be approximately 1000 psi, approximately 4000 psi, or within a range from approximately 200 psi to approximately 20,000 psi. The ratio of the contribution of the elastic coating to the contribution of the shell, e.g., with respect to the properties of the shell such as thickness and/or elastic modulus, may be any suitable value, such as approximately 100:0, 90:10, 80:20, 70:30, 60:40, 50:50, 40:60, 30:70, 20:80, 10:90, or 0:100. The properties of the elastic coating can be selected so as to exert forces on the patient's teeth for eliciting various tooth movements (e.g., translation, rotation, extrusion, intrusion, tipping) as part of an orthodontic treatment procedure.

Figure 3A:
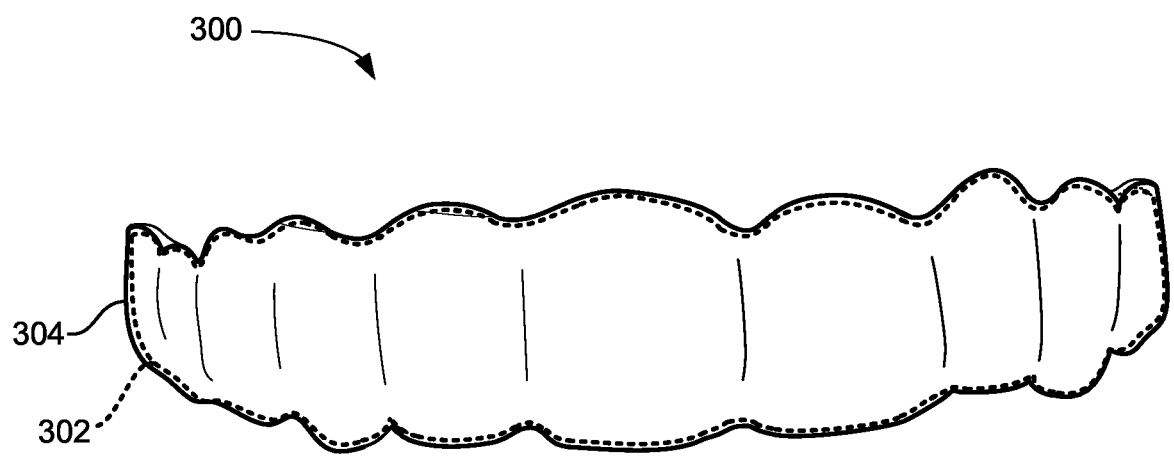
FIG. 3A illustrates an elastic-coated orthodontic appliance, in accordance with many embodiments.
Figure 3B:
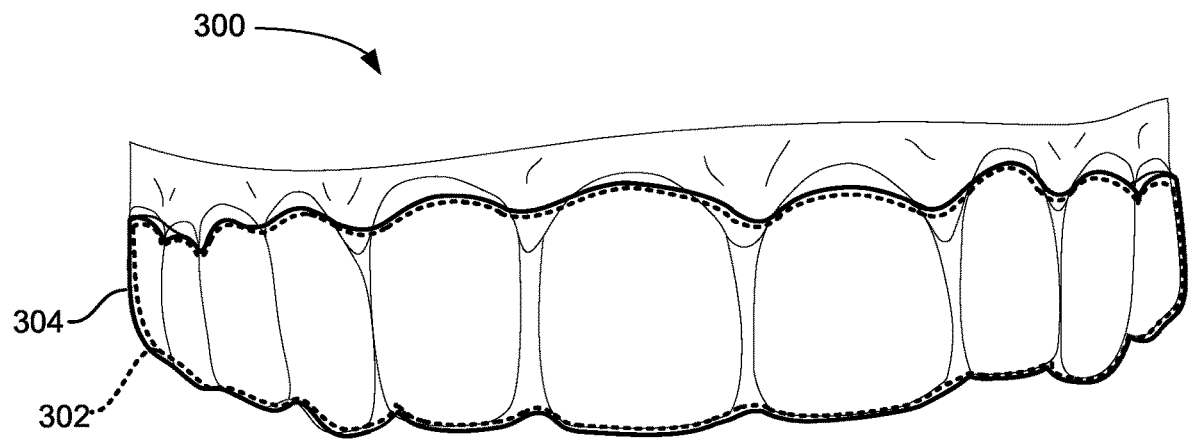
FIG. 3B illustrates the appliance of FIG. 3A placed over the teeth of a patient, in accordance with many embodiments.
Figure 3C:
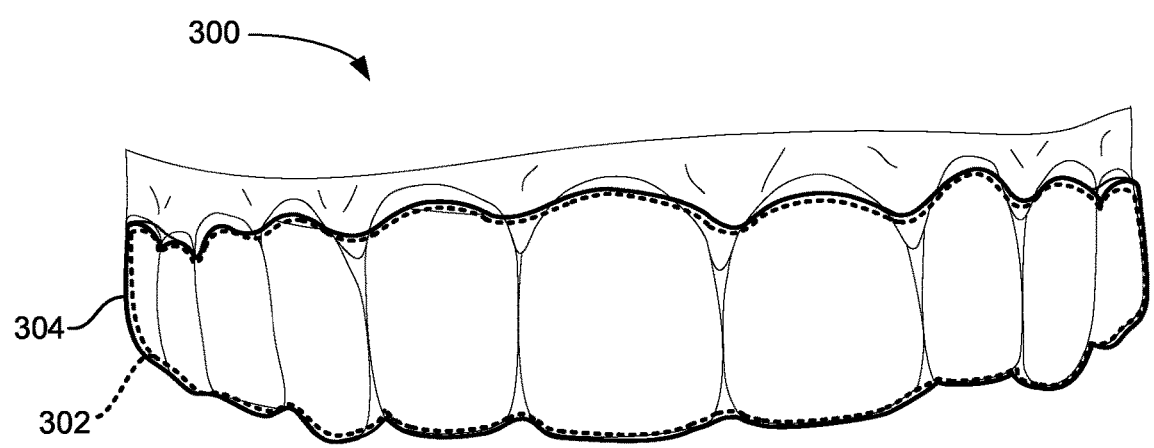
FIG. 3C illustrates the appliance of FIG. 3B after tooth repositioning has occurred, in accordance with many embodiments.

FIGS. 3A through 3C illustrate an elastic-coated orthodontic appliance 300, in accordance with many embodiments. The appliance 300 includes a shell 302 covered by an elastic coating 304. The shell 302 can include a plurality of cavities adapted to receive some or all of the teeth of a patient's arch. The elastic coating 304 can cover a portion of the shell 302, including one or more of the exterior and/or interior surfaces of the shell 302. The terms interior surface and exterior surface may be used herein to refer to surfaces adjacent to and away from the received teeth, respectively. The elastic coating 304 may conform to the surface topography of the shell 302, so that the tooth arrangement specified by the geometry of the elastic coating is identical or similar to the tooth arrangement of the shell 302. In some instances, the elastic coating 304 may form a single continuous layer covering the entirety of the shell 302. Alternatively, the elastic coating 304 may cover only some portions of the shell 302, leaving other portions exposed. For example, the elastic coating 304 may cover only the exterior surface of the shell 302 or only the interior surface of the shell 302.

The shell 302 can be a flexible shell that is relatively thin and compliant compared to the elastic coating 304. For instance, the thickness of the shell 302 can be less than or equal to approximately 0.02 mm, or within a range from approximately 0.01 mm to approximately 0.3 mm, whereas the thickness of the elastic coating 304 can be greater than or equal to approximately 0.01 mm, or within a range from approximately 0.01 mm to approximately 4 mm. Consequently, the overall properties of the coated portions of the appliance 300 may be determined mainly by the properties of the elastic coating 304, rather than by the properties of the shell 302. As an example, the stiffness of the elastic coating 304 may dictate the stiffness of the coated portions of the appliance 300, with minimal or no contribution from the shell 302. The shell 302 may serve primarily as a template or "skeleton" for forming the geometry of the elastic coating 304, and may provide little or no structural support to the overall appliance 300. In many embodiments, the shell 302 applies little or no force when deflected by a patient's teeth (e.g., when worn). Alternatively, the overall properties of the coated portions of the appliance 300 may be determined by any suitable combination of the properties of the elastic coating 304 and the properties of the shell 302. For example, the stiffness of the coated portions of the appliance 300 may be determined partially by the stiffness of the elastic coating 304 and partially by the stiffness of the shell 302. The properties of the shell 302 and/or elastic coating 304 (e.g., thickness, elastic modulus) can be varied as desired in order to generate the appropriate forces for repositioning teeth. The elastic modulus of the shell 302 may be approximately 2000 psi, or within a range from approximately 200 psi to approximately 20,000 psi. The elastic modulus of the coating 304 may be approximately 1000 psi, approximately 4000 psi, or within a range from approximately 200 psi to approximately 20,000 psi. The ratio of the contribution of the coating 304 to the contribution of the shell 302, e.g., with respect to the properties of the shell such as thickness and/or elastic modulus, may be any suitable value, such as approximately 100:0, 90:10, 80:20, 70:30, 60:40, 50:50, 40:60, 30:70, 20:80, 10:90, or 0:100.

When the appliance 300 is worn by a patient (as depicted in FIG. 3B), the shell 302 may readily deform (e.g., flex, stretch) to accommodate the patient's current tooth arrangement. The deformation may result from an intentional mismatch between the geometry of the appliance 300 (e.g., the shell 302 and/or elastic coating 304) and the patient's current tooth arrangement. The elastic coating 304 can resist the deformation of the shell 302, such that the overall extent of deformation of the appliance 300 is smaller than what would occur if the coating 304 were not present. The resistance of the elastic coating 304 to deformation can exert forces onto the underlying teeth, thereby eliciting movements of one or more teeth with respect to up to six degrees of freedom of motion (e.g., translation, rotation, intrusion, extrusion, tipping, torqueing, etc.). Alternatively or in combination, the elastic coating 304 may apply forces to one or more teeth in order to retain the teeth at their current positions and/or orientations. The repositioning or movements of the teeth may reduce the extent of deformation of the elastic coating 304 and shell 302, thus decreasing the amount of force applied to the teeth (as depicted in FIG. 3C).

The properties of the elastic coating (e.g., length, width, thickness, area, shape, cross-section, stiffness, elastic coefficient, etc.) can be used to control the magnitude and/or direction of the forces exerted on the teeth. These properties may be homogeneous or approximately homogeneous throughout the entire coating. Approximately homogeneous may mean that the variations of the properties are no higher than 50%, no higher than 25%, or no higher than 10% of the largest value of this property present in the coating. Alternatively, the coating may be heterogeneous, such that some or all of these properties are variable, e.g., some or all of these properties are higher than 10%, higher than 25%, or higher than 50% of the largest value of the property present in the coating. For instance, the coating can include a plurality of different portions, some of which may have different properties. The portions may span a plurality of teeth, a single tooth, or parts of one or more teeth. A portion may have approximately uniform properties, or may have variable properties. The geometry and configuration of the different portions can be selected based on the targeted tooth movements for the current treatment stage. As an example, portions adjacent to teeth targeted for repositioning may have a greater stiffness than portions adjacent to teeth used for anchoring the appliance. Furthermore, in some instances, the elastic coating can have anisotropic characteristics or properties. For example, at least some portions of the elastic coating may be relatively compliant along a first direction, and less compliant (or noncompliant) along a second direction. The directionality of the elastic coating can be used to control the direction of the resultant forces applied to the teeth.

Figure 4A:
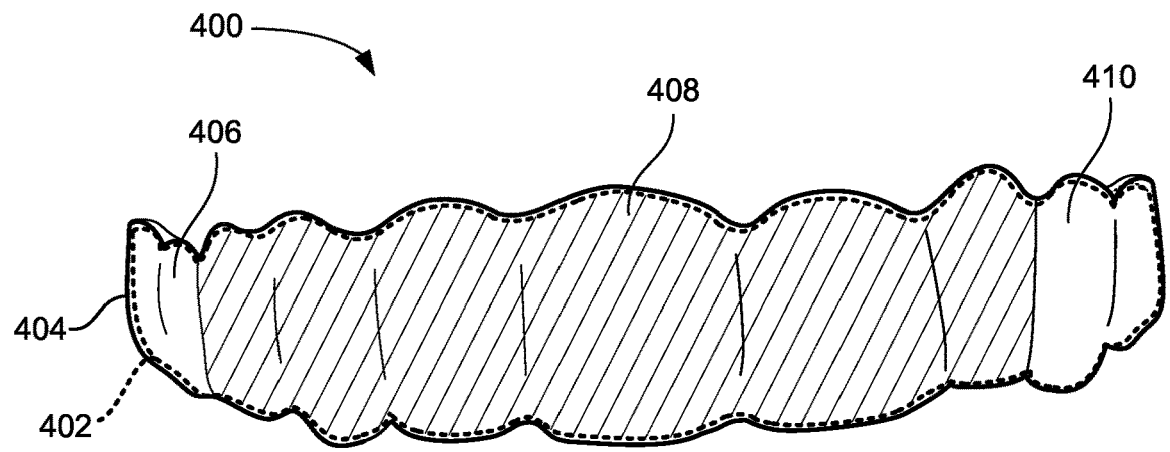
FIG. 4A illustrates an elastic-coated orthodontic appliance with segments, in accordance with many embodiments.
Figure 4B:
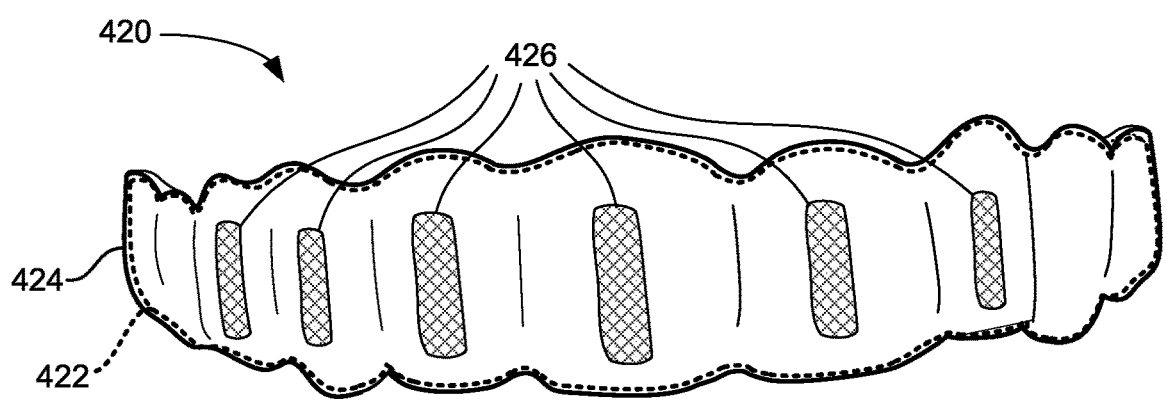
FIG. 4B illustrates an elastic-coated orthodontic appliance with discrete regions, in accordance with many embodiments.
Figure 4C:
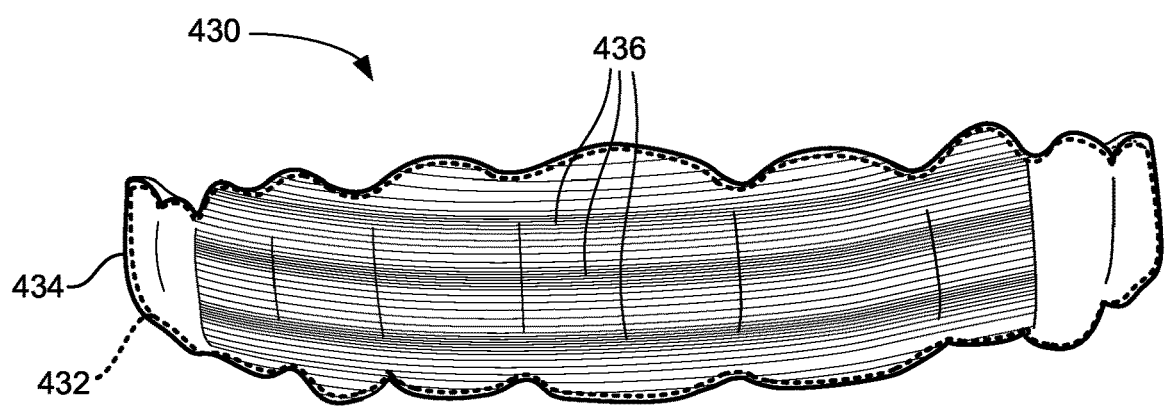
FIG. 4C illustrates an elastic-coated orthodontic appliance with striations, in accordance with many embodiments.

FIG. 4A through 4C illustrate various examples of elastic-coated appliances with heterogeneous properties, in accordance with many embodiments. The appliance 400 of FIG. 4A includes a shell 402 covered by an elastic coating 404 having a plurality of segments 406, 408, 410. In one embodiment, when the appliance 400 is worn by a patient, the segment 408 covers a plurality of front teeth, while the segments 406, 410 cover a plurality of back teeth. However, it will be appreciated that the coating 404 can include any number of segments, each covering one or more teeth or parts thereof. The geometry and properties of each segment can be varied as necessary in order to apply the desired forces to the patient's teeth. Some segments of the coating 404 may have different properties than other segments. This may mean, for example, that the variations in a property are higher than 10%, higher than 25%, or higher than 50% of the maximum value present for the property in the segments. For example, the segment 408 may have a different thickness, stiffness, etc. compared to the segments 406, 410. Conversely, some segments may have the same or similar properties (e.g., segments 406, 410). Similar properties may mean, for instance, that the variations in a property are no higher than 50%, no higher than 25%, or no higher than 10% of the maximum value present for the property in the segments.

FIG. 4B illustrates an appliance 420 in which the shell 422 is covered by an elastic coating 424 with a plurality of discrete regions 426. The properties of the regions 426 (e.g., stiffness, thickness, etc.) may differ from the properties of the surrounding portions of the coating 424. In many embodiments, the geometry (e.g., size, surface area, shape), arrangement, and properties of the regions 426 are designed to facilitate the repositioning of one or more teeth. For instance, although the regions 426 are depicted in FIG. 4B as covering portions of the buccal surfaces of the teeth, in other embodiments, the regions 426 may additionally or alternatively cover other portions of the teeth, such as portions of one or more lingual surfaces, one or more occlusal surfaces, one or more interproximal regions, or suitable combinations thereof.

FIG. 4C illustrates an appliance 430 in which the shell 432 is covered by an elastic coating 434 having a plurality of striations 436. The properties of the elastic coating 434 may vary according to the striation pattern. For example, in one embodiment, each of the striations 436 may have an increased thickness compared to other portions of the coating 434. This may mean, for example, that each of the striations is more than 10%, more than 25%, more than 50%, or more than 100% thicker than the portion of the coating with the least thickness. As another example, the striations 436 may correspond to bands of stiffer material formed in the coating 434. The striations 436 may extend across the entirety of the appliance 430 or only across certain portions of the appliance 430. The striations 436 can be oriented along a mesial-distal direction (as depicted in FIG. 4C), a gingival-occlusal direction, or any other direction suitable for facilitating the desired tooth movements. Similar to the other embodiments provided herein, the geometry (e.g., length, width, spacing, gradient) and properties of the striations 436 can be determined based on the targeted tooth movements for the appliance 430.

The elastic-coated appliances described herein may accommodate various different configurations for elastic materials used for the elastic coating, including different compositions and/or structures of elastic materials. Elastic material for the coating may include a single continuous coating of elastic material or multiple coatings of the same elastic material, different materials, or a combination of some coatings of the same material and one or more coatings of different material(s). Properties of the elastic coating such as resiliency, elasticity, hardness/softness, color, and the like can be determined, at least partially, based on the selected material, coatings of material, and/or elastic coating thickness. In some instances, the elastic material or coating can be configured such that one or more properties are uniform along a length or portion of the elastic (or entire elastic). Additionally, one or more properties of the elastic material or coating may vary along a length or portion of the elastic (or entire elastic). This may mean, for example, that the variations in a property may be greater than 10%, greater than 25%, or greater than 50% of the maximum value of the property along the length or portion of the elastic (or entire elastic). For example, an elastic or coating may have substantially uniform thickness along a length or portion, or may vary along a length/portion. As will be appreciated, characteristics of the elastic or coating may be selected so as to affect the force application to the patient's teeth or tooth movement aspects of a particular treatment desired.

Figure 5:
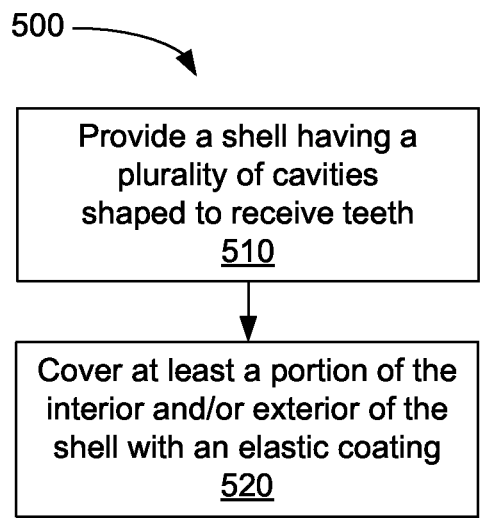
FIG. 5 illustrates a method for creating an orthodontic appliance, in accordance with many embodiments.
Figure 6A:
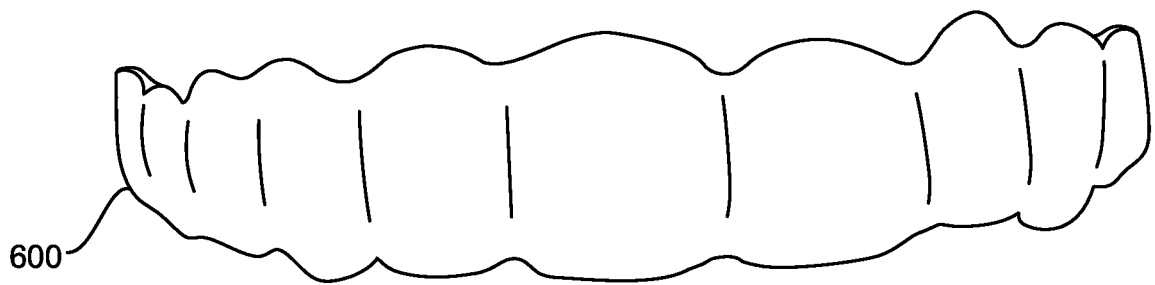
FIGS. 6A and 6B illustrate fabrication of an orthodontic appliance, in accordance with many embodiments.
Figure 6B:
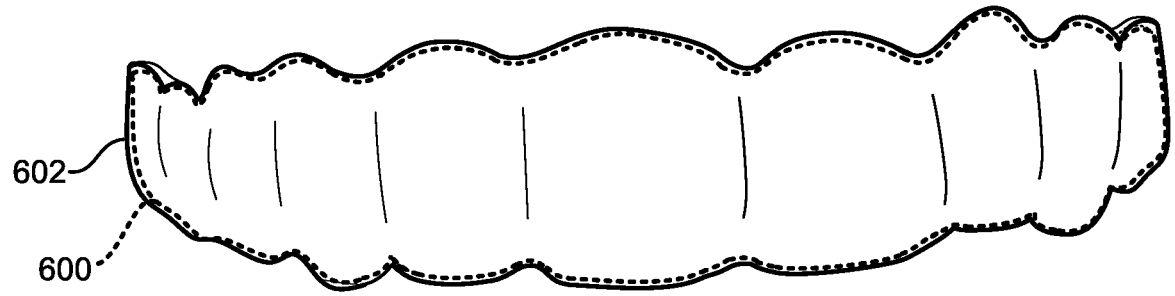

FIG. 5 illustrates a method 500 for creating an orthodontic appliance, in accordance with many embodiments. The method 500 can be applied to any embodiment of the orthodontic appliances described herein. FIGS. 6A and 6B illustrate fabrication of an orthodontic appliance, in accordance with many embodiments.

In step 510, a shell having a plurality of cavities shaped to receive teeth is provided (see, e.g., shell 600 of FIG. 6A). Exemplary methods for fabricating shells include thermoforming, rapid prototyping (e.g., stereolithography, 3D printing, etc.), or computer numerical control (CNC) milling. For example, the shell can be thermoformed from one or more layers of polymer sheets. The material(s) used for the shell may be translucent or colored. Alternatively, the shell or shell segments can be transparent, opaque, or any other suitable level of optical clarity. In some instances, the shell can be fabricated based on a physical or digital model of the patient's teeth. The model can be generated from dental impressions or scanning (e.g., of the patient's intraoral cavity, of a positive or negative model of the patient's intraoral cavity, or of a dental impression formed from the patient's intraoral cavity).

In step 520, at least a portion of the interior and/or exterior of the shell (e.g., interior and/or exterior surfaces) is covered with an elastic coating (see, e.g., elastic coating 602 of FIG. 6B). The elastic coating can be provided as strips, meshes, sheets, or layers, or suitable combinations thereof. Any suitable material or combination of materials can be used for the elastic coating, such as rubber, latex, polyurethane, or other elastomeric or biocompatible materials. The elastic material can have varying levels of optical clarity. In many embodiments, the elastic material is transparent, translucent, or opaque. Optionally, the material may be translucent or colored so as to improve the aesthetics of the appliance when worn by the patient.

The elastic coating can be placed on the shell using any suitable method, including spraying, dipping, extrusion, deposition, painting, sputtering, casting, dip-coating, and the like, or combinations thereof. In some instances, the elastic coating can be coupled to the shell, using suitable adhesives, bonding agents and the like. Alternatively, the elastic coating may have adhesive properties, thus allowing the coating to be directly attached to the shell without the use of additional external agents. The elastic coating may include different portions with differing properties, as discussed above, with different portions being fabricated using different materials and/or techniques. In one embodiment, the elastic coating can be directly fabricated on the shell by using an extrusion system to place one or more layers of material onto the shell. The extruded material can be provided in any suitable form (e.g., a fluid or gel, a solid such as a filament). A fluid material can be cured or fixed as it is dispensed from the extrusion system in order to solidify the elastic coating, e.g., using various energy sources such as ultraviolet, infrared, laser, and/or thermal energy sources. Alternatively or in combination, the elastic coating can be placed or deposited by a manufacturing system configured to attach discrete pieces of material (e.g., bands, strips, layers) to the shell. The fabrication systems presented herein may be computer-controlled systems, thereby permitting fully automated manufacturing of orthodontic appliances.

Although the above steps show a method 500 for creating an orthodontic appliance in accordance with embodiments, a person of ordinary skill in the art will recognize many variations based on the teaching described herein. Some of the steps may comprise sub-steps. Many of the steps may be repeated as often as is beneficial. One or more steps of the method 500 may be applied to any suitable orthodontic appliance, such as the embodiments described herein.

Moreover, in many embodiments, the shell is removed from the orthodontic appliance once the elastic coating has been applied (e.g., after the step 520 has been performed), thereby resulting in an "elastic appliance" that includes the elastic coating without the shell. Optionally, the resultant elastic appliance may include only the elastic coating. Various methods can be used to remove the shell from the elastic coating, e.g., by dissolving the shell, applying a releasing agent allowing the shell to be physically separated from the elastic coating without damaging the elastic coating, or combinations thereof. Accordingly, in such embodiments, the shell serves only as a fabrication template for the geometry of the elastic coating and is therefore not intended for use in the final appliance for treating the patient. The forces applied to the patient's teeth when the elastic appliance is worn can result solely from the deformation of the elastic appliance (e.g., due to mismatch between the patient's current tooth arrangement and the tooth arrangement defined by the geometry elastic coating).

This approach of removing the shell following application of the elastic coating can be advantageous in producing appliances made of elastic materials that would otherwise be relatively difficult to directly fabricate without use of a template. Moreover, the properties of such elastic appliances can be locally varied (e.g., by locally changing the coating thickness, coating material, degree of cure, etc.), thus allowing for appliances with heterogeneous properties, in contrast to conventional sheet-based thermoforming methods which produce relatively homogeneous appliances. Additionally, this technique is compatible with thermoset materials such as thermoset elastomers, which may provide better resistance to stress relaxation than thermoplastic materials (e.g., thermoplastic elastomers) typically used in thermoforming procedures. It shall be understood that any of the embodiments of the orthodontic appliances provided herein can be further modified as described herein to remove the shell and retain only the elastic coating, and the elastic appliances resulting from such modifications are considered part of the present disclosure.

Appliance fabrication or design can make use of one or more physical or digital representations of the patient's teeth. Representations of the patient's teeth can include representations of the patient's teeth in a current arrangement, and may further include representations of the patient's teeth repositioned in one or more treatment stages. Treatment stages can include a desired or target arrangement of the patient's teeth, such as a desired final arrangement of teeth. Treatment stages can also include one or more intermediate arrangements of teeth (e.g., planned intermediate arrangements) representing arrangements of the patient's teeth as the teeth progress from a first arrangement (e.g., initial arrangement) toward a second or desired arrangement (e.g., desired final arrangement).

Figure 7:
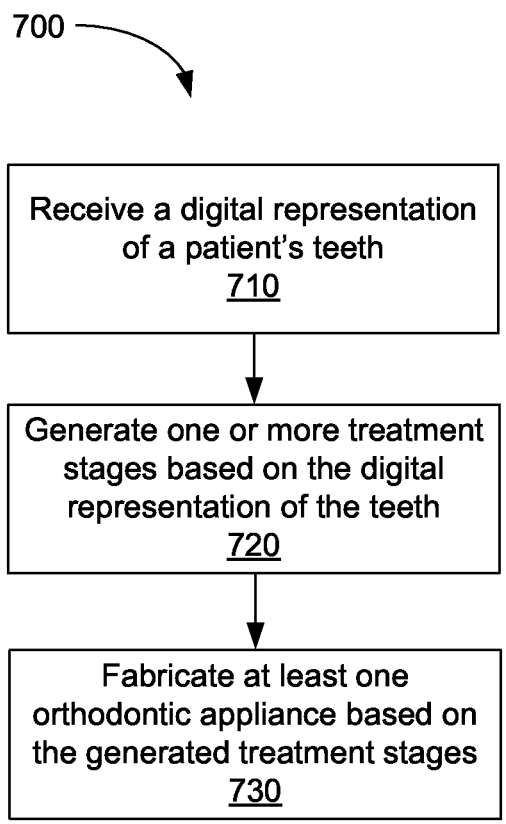
FIG. 7 illustrates a method for digitally planning an orthodontic treatment, in accordance with many embodiments.

FIG. 7 illustrates a method 700 for digitally planning an orthodontic treatment and/or design or fabrication of an appliance, in accordance with many embodiments. The method 700 can be applied to any of the treatment procedures described herein and can be performed by any suitable data processing system.

In step 710, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 720, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 730, at least one orthodontic appliance is fabricated based on the generated treatment stages. For example, a set of appliances can be fabricated to be sequentially worn by the patient to incrementally reposition the teeth from the initial arrangement to the target arrangement. Some of the appliances can be shaped to accommodate a tooth arrangement specified by one of the treatment stages. Alternatively or in combination, some of the appliances can be shaped to accommodate a tooth arrangement that is different from the target arrangement for the corresponding treatment stage. For example, as previously described herein, an appliance may have a geometry corresponding to an overcorrected tooth arrangement. Such an appliance may be used to ensure that a suitable amount of force is expressed on the teeth as they approach or attain their desired target positions for the treatment stage. As another example, an appliance can be designed in order to apply a specified force system on the teeth and may not have a geometry corresponding to any current or planned arrangement of the patient's teeth.

The appliance set may include one or more of the elastic-coated orthodontic appliances described herein. The properties of the shell and/or elastic coating of such appliances (e.g., geometry, configuration, material characteristics, etc.) can be selected to elicit the tooth movements specified by the corresponding treatment stage. At least some of these properties can be determined via suitable computer software or other digital-based approaches. For example, computer modeling strategies can be used to determine suitable force systems including one or more forces and/or torques to be applied to the teeth in order to elicit the desired tooth movements. The properties of the shell and/or elastic coating can be then be designed to provide the specified forces and/or torques when the appliance is worn by the patient during an appropriate stage of treatment. Additional examples of digital modeling techniques suitable for use with the embodiments provided herein are described in application Ser. Nos. 12/623,340, 12/324,714, and 13/365,167, and in U.S. Pat. No. 8,439,672, the disclosures of which are herein incorporated by reference in their entirety. The digital models created using such methods may be used as input to a computer-controlled fabrication system for fabricating appliances.

Although the above steps show method 700 of digitally planning an orthodontic treatment and/or design or fabrication of an appliance in accordance with embodiments, a person of ordinary skill in the art will recognize many variations based on the teaching described herein. Some of the steps may comprise sub-steps. Many of the steps may be repeated as often as is beneficial to the design and/or fabrication process. One or more steps of the method 700 may be applied to the fabrication of any orthodontic appliance, such as the embodiments described herein. Some of the steps may be optional, and the order of the steps can be varied. In some instances, staging of various arrangements or treatment stages may not be necessary for design and/or fabrication of an appliance. As illustrated by the dashed line in FIG. 7, design and/or fabrication of an orthodontic appliance, and perhaps a particular orthodontic treatment, may include use of a representation of the patient's teeth (e.g., receive a digital representation of the patient's teeth 710), followed by design and/or fabrication of an orthodontic appliance based on a representation of the patient's teeth in the arrangement represented by the received representation. For example, a shell may be generated based on the representation of the patient's teeth (e.g., as in step 710), then coated with elastic to generate an appliance described in various embodiments herein.

Figure 8:
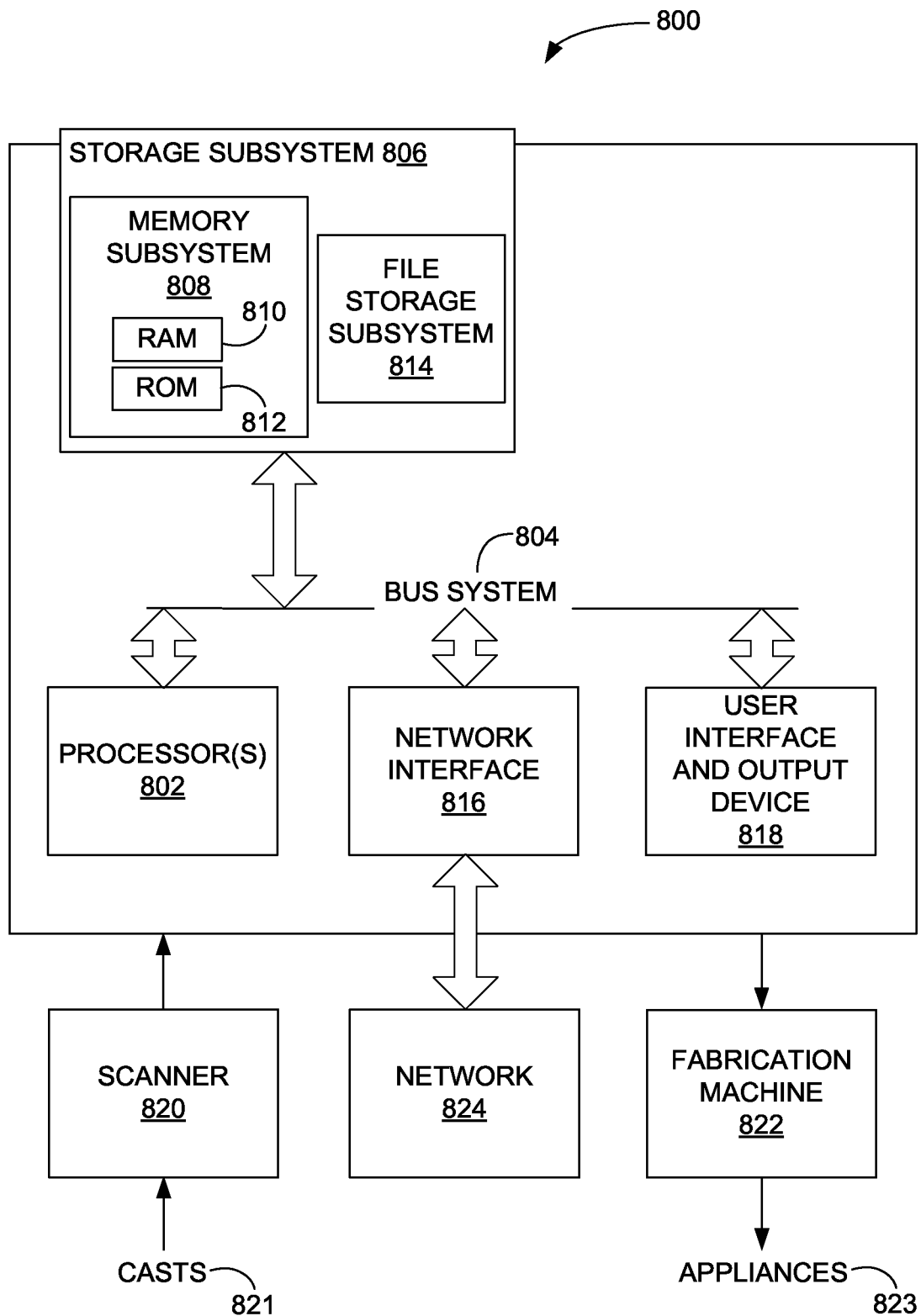
FIG. 8 is a simplified block diagram of a data processing system, in accordance with many embodiments.

FIG. 8 is a simplified block diagram of a data processing system 800 that may be used in executing methods and processes described herein. The data processing system 800 typically includes at least one processor 802 that communicates with one or more peripheral devices via bus subsystem 804. These peripheral devices typically include a storage subsystem 806 (memory subsystem 808 and file storage subsystem 814), a set of user interface input and output devices 818, and an interface to outside networks 816. This interface is shown schematically as "Network Interface" block 816, and is coupled to corresponding interface devices in other data processing systems via communication network interface 824. Data processing system 800 can include, for example, one or more computers, such as a personal computer, workstation, mainframe, laptop, and the like.

The user interface input devices 818 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 806 maintains the basic required programming, including computer readable media having instructions (e.g., operating instructions, etc.), and data constructs. The program modules discussed herein are typically stored in storage subsystem 806. Storage subsystem 806 typically includes memory subsystem 808 and file storage subsystem 814. Memory subsystem 808 typically includes a number of memories (e.g., RAM 810, ROM 812, etc.) including computer readable memory for storage of fixed instructions, instructions and data during program execution, basic input/output system, etc. File storage subsystem 814 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 820 includes any means for obtaining a digital representation (e.g., images, surface topography data, etc.) of a patient's teeth (e.g., by scanning physical models of the teeth such as casts 821, by scanning impressions taken of the teeth, or by directly scanning the intraoral cavity), which can be obtained either from the patient or from treating professional, such as an orthodontist, and includes means of providing the digital representation to data processing system 800 for further processing. Scanner 820 may be located at a location remote with respect to other components of the system and can communicate image data and/or information to data processing system 800, for example, via a network interface 824. Fabrication system 822 fabricates appliances 823 based on a treatment plan, including data set information received from data processing system 800. Fabrication machine 822 can, for example, be located at a remote location and receive data set information from data processing system 800 via network interface 824.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An orthodontic appliance, comprising:
   a deformable shell having:
      an exterior surface, the exterior surface comprising an exterior incisal portion corresponding to at least an adjacent pair of left and right central incisors of a patient's teeth; and
      an interior surface, the interior surface comprising a plurality of tooth-receiving cavities shaped to receive a first arrangement of the patient's teeth and to provide a first deformation to accommodate the patient's teeth, wherein the plurality of tooth-receiving cavities comprises an interior incisal portion shaped to receive at least the adjacent pair of left and right central incisors of the patient's teeth, the interior incisal portion comprising a first stiffness;

a resistive elastic coating formed over the exterior incisal portion, wherein the resistive elastic coating comprises the first stiffness, and wherein the resistive elastic coating provides a first resistance to the first deformation, the first resistance exerting one or more orthodontic positioning forces on the patient's teeth; and a plurality of striations formed as part of the geometry of the resistive elastic coating, wherein the plurality of striations comprises at least a first striation, second striation, and third striation, wherein the first striation, second striation, and third striation each extend in a mesial-distal direction over at least the exterior incisal portion, and wherein the first striation, second striation, and third striation each provide an increased thickness along the exterior surface of the deformable shell;

wherein the resistive elastic coating and the plurality of striations comprise a polymeric material; and wherein the plurality of striations form at least a portion of an exterior surface of the orthodontic appliance.

2. The appliance of claim 1, wherein the resistive elastic coating comprises a variable stiffness over the exterior incisal portion of the deformable shell.

3. The appliance of claim 1, wherein the resistive elastic coating comprises a sprayed resistive coating.

4. The appliance of claim 1, wherein the resistive elastic coating comprises an extruded resistive coating.

5. The appliance of claim 1, wherein the resistive elastic coating comprises one or more discrete pieces of resistive elastic material coupled to the deformable shell.

6. The appliance of claim 1, wherein the resistive elastic coating is transparent, translucent, or opaque.

7. The appliance of claim 1, wherein the resistive elastic coating is colored.

8. The appliance of claim 1, wherein the deformable shell is flexible.

9. The appliance of claim 1, wherein a thickness of the deformable shell is less than or equal to about 0.02 millimeters (mm).

10. An orthodontic system, comprising:

a plurality of orthodontic appliances successively wearable by a patient to orthodontically reposition one or more teeth from a first arrangement toward a second arrangement, and wherein at least one orthodontic appliance of the plurality of orthodontic appliances comprises:

a deformable appliance shell having:

an exterior surface, the exterior surface comprising an exterior incisal portion corresponding to at least an adjacent pair of left and right central incisors of the patient's teeth;

an interior surface, the interior surface comprising a plurality of tooth-receiving cavities shaped to receive the patient's teeth and to provide a first deformation to accommodate the patient's teeth, wherein the plurality of tooth-receiving cavities comprises an interior incisal portion shaped to receive at least the adjacent pair of left and right central incisors of the patient's teeth, the interior incisal portion comprising a first stiffness;

a resistive elastic coating formed over the exterior incisal portion, wherein the resistive elastic coating comprises the first stiffness, and wherein the resistive elastic coating provides a first resistance to the first deformation, the first resistance exerting one or more orthodontic positioning forces on the patient's teeth; and a plurality of striations formed as part of the geometry of the resistive elastic coating, wherein the plurality of striations comprises at least a first striation, second striation, and third striation, wherein the first striation, second striation, and third striation each extend in a mesial-distal direction over at least the exterior incisal portion, and wherein the first striation, second striation, and third striation each provide an increased thickness along the exterior surface of the deformable shell;

wherein the resistive elastic coating and the plurality of striations comprise a polymeric material; and wherein the plurality of striations form at least a portion of an exterior surface of the at least one orthodontic appliance.

11. The system of claim 10, wherein a stiffness of the resistive elastic coating comprises a variable stiffness over the exterior incisal portion of the deformable appliance shell.

12. The system of claim 10, wherein the resistive elastic coating comprises a sprayed resistive elastic coating.

13. The system of claim 10, wherein the resistive elastic coating comprises an extruded resistive elastic coating.

14. The system of claim 10, wherein the resistive elastic coating comprises one or more discrete pieces of resistive elastic material coupled to the deformable appliance shell.

15. The system of claim 10, wherein the resistive elastic coating is transparent, translucent, or opaque.

16. The system of claim 10, wherein the resistive elastic coating is colored.

17. The system of claim 10, wherein the deformable appliance shell is flexible.

18. The system of claim 10, wherein a thickness of the deformable appliance shell is less than or equal to 0.02 millimeters (mm).

19. A method for creating an orthodontic appliance, the method comprising:

providing a deformable shell having a plurality of tooth-receiving cavities shaped to receive a first arrangement of a patient's teeth, the patient's teeth including an adjacent pair of left and right central incisors, and the deformable shell comprising:

an exterior surface, the exterior surface comprising an exterior incisal portion corresponding to at least the adjacent pair of left and right central incisors of the patient's teeth;

an interior surface, the interior surface comprising the plurality of tooth-receiving cavities shaped to receive the first arrangement of the patient's teeth and to provide a first deformation to accommodate the patient's teeth, wherein the plurality of tooth-receiving cavities comprises an interior incisal portion shaped to receive at least the adjacent pair of left and right central incisors of the patient's teeth;

forming a resistive elastic coating on a location over at least the exterior incisal portion; and forming a plurality of striations as part of the geometry of the resistive elastic coating, wherein the plurality of striations comprises at least a first striation, second striation, and third striation, wherein the first striation, second striation, and third striation each extend in a mesial-distal direction over at least the exterior incisal portion, and wherein the first striation, second striation, and third striation each provide an increased thickness along the exterior surface of the deformable shell;

wherein the resistive elastic coating and the plurality of striations comprise a polymeric material; and wherein the plurality of striations form at least a portion of an exterior surface of the orthodontic appliance.

20. The method of claim 19, wherein the resistive elastic coating comprises a variable stiffness over the exterior incisal portion of the deformable shell.

21. The method of claim 19, wherein forming the resistive elastic coating comprises spraying the resistive elastic coating onto the exterior portion of the deformable shell.

22. The method of claim 19, wherein forming the resistive elastic coating comprises extruding the resistive elastic coating onto the exterior portion of the deformable shell.

23. The method of claim 19, wherein forming the resistive elastic coating comprises attaching discrete pieces of resistive elastic material to the deformable shell.

24. The method of claim 19, wherein the resistive elastic coating is transparent, translucent, or opaque.

25. The method of claim 19, wherein the resistive elastic coating is colored.

26. The method of claim 19, wherein the deformable shell is flexible.

27. The method of claim 19, wherein a thickness of the deformable shell is less than or equal to about 0.02 millimeters (mm).

28. A method for creating an orthodontic appliance, the method comprising:

providing a deformable shell having a plurality of tooth-receiving cavities shaped to receive a first arrangement of a patient's teeth, including a pair of tooth-receiving cavities shaped to receive an adjacent pair of left and right central incisors, and comprising an interior surface and an exterior surface, the deformable shell configured to provide a first deformation to accommodate the first arrangement of the patient's teeth;

forming over at least a portion of one or more of the interior surface or exterior surface of the deformable shell, including the pair of tooth-receiving cavities shaped to receive the adjacent pair of left and right central incisors, a resistive elastic coating, wherein the resistive elastic coating is configured to provide a first resistance to the first deformation provided by the deformable shell, the first resistance exerting one or more orthodontic positioning forces on the patient's teeth, and a plurality of striations, wherein the plurality of striations are formed as part of the geometry of the resistive elastic coating, the plurality of striations each extending in a mesial-distal direction across a portion of an interior surface or exterior surface of the resistive elastic coating and an incisal pair of tooth-receiving cavities shaped to receive the adjacent pair of left and right central incisors of the patient's teeth, the portion extending across the plurality of tooth-receiving cavities and across the pair of tooth-receiving cavities shaped to receive the adjacent pair of left and right central incisors of the patient's teeth of the deformable shell, and the plurality of striations configured to provide a first stiffness to the orthodontic appliance, wherein the resistive elastic coating and the plurality of striations comprise a polymeric material, and wherein the resistive elastic coating and the plurality of striations form at least a portion of an exterior surface of the orthodontic appliance; and removing the deformable shell from the resistive elastic coating in order to form the orthodontic appliance comprising the resistive elastic coating.

29. The method of claim 28, wherein removing the deformable shell comprises dissolving the deformable shell.

30. The method of claim 28, wherein removing the deformable shell comprises releasing the deformable shell from the resistive elastic coating.

31. The method of claim 28, wherein forming the resistive elastic coating comprises spraying the resistive elastic coating onto the portion of the deformable shell.

32. The method of claim 28, wherein forming the resistive elastic coating comprises extruding the resistive elastic coating onto the portion of the deformable shell.

33. The method of claim 28, wherein forming the resistive elastic coating comprises attaching discrete pieces of resistive elastic material to the deformable shell.

\* \* \* \* \*